US010836929B2

(12) United States Patent
Bowman et al.

(10) Patent No.: US 10,836,929 B2
(45) Date of Patent: Nov. 17, 2020

(54) POLYESTER POLYMERS COMPRISING LIGNIN

(71) Applicant: PPG Industries Ohio, Inc., Cleveland, OH (US)

(72) Inventors: Mark Paul Bowman, New Kensington, PA (US); Carole A. Conley, Saxonburg, PA (US); Irina G. Schwendeman, Wexford, PA (US); Mercy M. Hibbert, Alphington (AU)

(73) Assignee: PPG Industries Ohio, Inc., Cleveland, OH (US)

( * ) Notice: Subject to any disclaimer, the term of this patent is extended or adjusted under 35 U.S.C. 154(b) by 27 days.

(21) Appl. No.: 15/833,592

(22) Filed: Dec. 6, 2017

(65) Prior Publication Data
US 2018/0118975 A1 May 3, 2018

Related U.S. Application Data

(63) Continuation of application No. 14/155,397, filed on Jan. 15, 2014, now abandoned.

(51) Int. Cl.
| C09D 197/00 | (2006.01) |
| C08J 7/04 | (2020.01) |
| C09D 167/08 | (2006.01) |
| B05D 7/00 | (2006.01) |
| B05D 7/16 | (2006.01) |
| B05D 7/14 | (2006.01) |
| B05D 3/02 | (2006.01) |
| B32B 15/04 | (2006.01) |
| B32B 27/36 | (2006.01) |
| B32B 27/20 | (2006.01) |
| B32B 15/08 | (2006.01) |
| B32B 15/09 | (2006.01) |
| B32B 15/01 | (2006.01) |
| C08G 63/12 | (2006.01) |
| C08G 63/133 | (2006.01) |
| C08G 63/20 | (2006.01) |
| C08L 67/08 | (2006.01) |
| C08L 67/00 | (2006.01) |
| C08L 97/00 | (2006.01) |
(Continued)

(52) U.S. Cl.
CPC ............ C09D 197/00 (2013.01); C08J 7/042 (2013.01); C09D 167/08 (2013.01); B05D 3/02 (2013.01); B05D 3/0254 (2013.01); B05D 7/14 (2013.01); B05D 7/16 (2013.01); B05D 7/50 (2013.01); B05D 7/51 (2013.01); B05D 7/52 (2013.01); B05D 7/53 (2013.01); B05D 7/54 (2013.01); B05D 2202/10 (2013.01); B05D 2202/25 (2013.01); B05D 2350/65 (2013.01); B05D 2401/10 (2013.01); B05D 2401/40 (2013.01); B05D 2420/01 (2013.01); B05D 2425/01 (2013.01); B05D 2508/00 (2013.01); B05D 2602/00 (2013.01); B32B 15/012 (2013.01); B32B 15/04 (2013.01); B32B 15/043 (2013.01); B32B 15/08 (2013.01); B32B 15/09 (2013.01); B32B 27/20 (2013.01); B32B 27/36 (2013.01); B32B 2250/02 (2013.01); B32B 2250/03 (2013.01); B32B 2255/06 (2013.01); B32B 2255/26 (2013.01); B32B 2255/28 (2013.01); B32B 2307/752 (2013.01); B32B 2311/20 (2013.01); B32B 2311/24 (2013.01); B32B 2311/30 (2013.01); B32B 2367/00 (2013.01); C07G 1/00 (2013.01); C08G 63/12 (2013.01); C08G 63/133 (2013.01); C08G 63/20 (2013.01); C08H 6/00 (2013.01); C08J 3/24 (2013.01); C08J 2367/00 (2013.01); C08K 3/011 (2018.01); C08K 3/013 (2018.01); C08K 5/0025 (2013.01); C08L 67/00 (2013.01); C08L 67/02 (2013.01); C08L 67/03 (2013.01); C08L 67/08 (2013.01); C08L 97/005 (2013.01); C09D 7/40 (2018.01); C09D 7/65 (2018.01); C09D 167/00 (2013.01); C09D 167/02 (2013.01); C09D 167/03 (2013.01); Y10T 428/3179 (2015.04); Y10T 428/31681 (2015.04); Y10T 428/31786 (2015.04)

(58) Field of Classification Search
None
See application file for complete search history.

(56) References Cited

U.S. PATENT DOCUMENTS 2,209,289 A 7/1940 Wallace
3,546,199 A 12/1970 Christian et al.
(Continued)

FOREIGN PATENT DOCUMENTS

CN 103602116 A * 2/2014
CN 103665357 A * 3/2014
(Continued)

OTHER PUBLICATIONS

Ahvazi et al. "Preparation of Lignopolyols from Wheat Straw Soda Lignin" Journal of Agricultural and Food Chemistry, vol. 59, pp. 10505-10516. (2011) (Year: 2011).*
New Zealand—First Examination Report (IP No. 721881) (Jan. 13, 2017). (Year: 2017).*
(Continued)

Primary Examiner — Vivian Chen
(74) Attorney, Agent, or Firm — Michael J. Grese

(57) ABSTRACT

Disclosed is a polyester polymer prepared from a reaction mixture comprising a polyacid component and a polyol component that comprises lignin. Residues of lignin are incorporated into the backbone of the polyester polymer. Coatings comprising the same and substrates coated at least in part with such coatings are also disclosed.

10 Claims, No Drawings

(51) Int. Cl.

| | | |
|---|---|---|
| *C08L 67/03* | (2006.01) | |
| *C08L 67/02* | (2006.01) | |
| *C08H 7/00* | (2011.01) | |
| *C08K 3/011* | (2018.01) | |
| *C08K 3/013* | (2018.01) | |
| *C08K 5/00* | (2006.01) | |
| *C08J 3/24* | (2006.01) | |
| *C07G 1/00* | (2011.01) | |
| *C09D 167/02* | (2006.01) | |
| *C09D 167/03* | (2006.01) | |
| *C09D 7/65* | (2018.01) | |
| *C09D 7/40* | (2018.01) | |
| *C09D 167/00* | (2006.01) | |

(56) References Cited

U.S. PATENT DOCUMENTS

| | | | |
|---|---|---|---|
| 3,933,875 A | | 1/1976 | Brose et al. |
| 3,984,363 A | | 10/1976 | D'Alelio |
| 4,042,539 A | | 8/1977 | Fanning |
| 4,226,982 A | | 10/1980 | Blount |
| 4,339,366 A | | 7/1982 | Blount |
| 4,357,463 A | | 11/1982 | Blount |
| 4,359,548 A | | 11/1982 | Blount |
| 4,376,171 A | | 3/1983 | Blount |
| 4,383,049 A | | 5/1983 | Blount |
| 4,615,940 A | | 10/1986 | Panush et al. |
| 4,745,141 A | | 5/1988 | Akiyama et al. |
| 4,771,101 A | | 9/1988 | Pruett et al. |
| 4,803,255 A | | 2/1989 | Pruett et al. |
| 4,814,010 A | | 3/1989 | Tury |
| 5,468,791 A | * | 11/1995 | Yuan .................. C08G 18/838 |
| | | | 428/457 |
| 5,536,760 A | | 7/1996 | Friedlander et al. |
| 5,576,371 A | | 11/1996 | Kuo et al. |
| 5,646,214 A | | 7/1997 | Mayo |
| 5,902,646 A | | 5/1999 | Becker et al. |
| 6,063,864 A | | 5/2000 | Mather et al. |
| 6,072,015 A | | 6/2000 | Bolle et al. |
| 6,084,003 A | * | 7/2000 | Kurple .............. C08G 18/6492 |
| | | | 521/109.1 |
| 6,875,800 B2 | | 4/2005 | Vanier et al. |
| 6,972,098 B1 | * | 12/2005 | Viswanathan ......... C09D 5/024 |
| | | | 252/500 |
| 6,984,086 B1 | | 1/2006 | Rothman et al. |
| 7,226,971 B2 | | 6/2007 | Ramesh et al. |
| 7,605,194 B2 | | 10/2009 | Ferencz et al. |
| 7,666,951 B2 | | 2/2010 | Jennings et al. |
| 8,389,113 B2 | | 3/2013 | Ambrose et al. |
| 8,497,359 B2 | | 7/2013 | Fenn et al. |
| 2003/0017559 A1 | | 1/2003 | Donnelly et al. |
| 2003/0221751 A1 | * | 12/2003 | Claffey .................. C23C 22/10 |
| | | | 148/247 |
| 2005/0261464 A1 | | 11/2005 | Schorr |
| 2007/0215300 A1 | | 9/2007 | Upfal et al. |
| 2008/0004369 A1 | * | 1/2008 | Seppala ............... C08F 283/00 |
| | | | 522/165 |
| 2008/0025903 A1 | | 1/2008 | Cortright |
| 2008/0308243 A1 | | 12/2008 | Anderson et al. |
| 2009/0017215 A1 | | 1/2009 | Wu et al. |
| 2009/0062516 A1 | | 3/2009 | Belanger et al. |
| 2009/0069550 A1 | | 3/2009 | Belanger et al. |
| 2009/0171037 A1 | | 7/2009 | Aoshima et al. |
| 2009/0182084 A1 | | 7/2009 | Ding et al. |
| 2009/0269577 A1 | * | 10/2009 | Lamers .................. C09D 5/002 |
| | | | 428/336 |
| 2010/0055467 A1 | | 3/2010 | Kulfan |
| 2010/0055468 A1 | | 3/2010 | Cheng et al. |
| 2010/0055469 A1 | | 3/2010 | Cheng et al. |
| 2010/0071837 A1 | | 3/2010 | Kapp et al. |
| 2010/0168371 A1 | | 7/2010 | Berti et al. |
| 2010/0168461 A1 | | 7/2010 | Berti et al. |
| 2010/0297704 A1 | | 11/2010 | Li |
| 2011/0135943 A1 | | 6/2011 | Kinoshita et al. |
| 2011/0160482 A1 | | 6/2011 | Nagaki et al. |
| 2011/0244156 A1 | | 10/2011 | Lock et al. |
| 2011/0257273 A1 | | 10/2011 | Yabuuchi et al. |
| 2012/0128608 A1 | | 5/2012 | Rodrigues et al. |
| 2012/0136097 A1 | | 5/2012 | Berlin |
| 2012/0148740 A1 | | 6/2012 | Yang et al. |
| 2012/0177855 A1 | | 7/2012 | Cavallin et al. |
| 2012/0184701 A1 | | 7/2012 | Kubo et al. |
| 2012/0220676 A1 | | 8/2012 | Moens |
| 2013/0034741 A1 | | 2/2013 | Mauer, III et al. |
| 2013/0209690 A1 | * | 8/2013 | Bautista Mester ......................... |
| | | | C08G 63/6926 |
| | | | 427/327 |
| 2013/0225872 A1 | | 8/2013 | Ryba et al. |
| 2013/0252293 A1 | | 9/2013 | Chen et al. |
| 2013/0303711 A1 | | 11/2013 | Cao et al. |
| 2017/0275461 A1 | * | 9/2017 | Yamao ..................... C08K 5/17 |

FOREIGN PATENT DOCUMENTS

| | | |
|---|---|---|
| JP | 2010007001 A | 1/2010 |
| KR | 1020070107003 A | 11/2007 |
| WO | 9612774 A1 | 5/1996 |
| WO | 2013113462 A1 | 8/2013 |

OTHER PUBLICATIONS

Calvo-Flores et al., "Lignin as Renewable Raw Material", ChemSusChem, 2010, pp. 1227-1235, vol. 3.

Doherty et al., "Value-adding to Cellulosic Ethanol: Lignin Polymers", Industrial Crops and Products, 2011, pp. 259-276, vol. 33.

E. Sharmin, S. Ahmad, and F. Zafar. "Renewable Resources in Corrosion Resistance". Corrosion Resistance (Dr. Shih, Ed.) 2012.

Malutan et al., "Contribution to the Study of Hydroxymethylation Reaction of Alkali Lignin", BioResources, 2008, pp. 13-20, vol. 3(1).

Yao et al., "Controlled Polymerization of Next-Generation Renewable Monomers and Beyond," Macromolecules, 2013, pp. 1689-1712, vol. 46.

Hirose et al., "Novel Epoxy Resins Derived from Biomass Components," Procedia Chemistry 2012, vol. 4, pp. 26-33.

\* cited by examiner

POLYESTER POLYMERS COMPRISING LIGNIN

CROSS REFERENCE TO RELATED APPLICATIONS

This application is a continuation of U.S. application Ser. No. 14/155,397, filed Jan. 15, 2014, the disclosure of which is hereby incorporated in its entirety by reference.

STATEMENT REGARDING FEDERALLY SPONSORED RESEARCH

This invention was made with government support under Subcontract No. C11M11002 of Government Award No. 2010-38202-21853, awarded by the United States Department of Agriculture/National Institute of Food and Agriculture. The United States government may have certain rights in the invention.

FIELD OF THE INVENTION

The present invention relates to polyester polymers prepared from lignin such that the lignin is incorporated into the backbone of the polyester polymer. The present invention further relates to coatings comprising such polyester polymers and substrates to which such coatings are applied.

BACKGROUND OF THE INVENTION

Polyester resins are used in coating compositions either as a primary or additive resin and may be crosslinked using a crosslinking agent to form a film of coating composition on a substrate upon application and curing. Certain components of a polyester resin are costly, yet are traditionally considered necessary in order to provide a particular combination of characteristics such as smoothness, gloss, and performance characteristics such as chemical resistance, mar resistance and resistance to weathering or the like.

SUMMARY OF THE INVENTION

The present invention includes a thermoset coating composition comprising a polyester polymer prepared from a reaction mixture comprising (a) a polycarboxylic acid component and (b) a polyol component comprising lignin, such that residues of lignin are incorporated into the polyester.

Coatings include clearcoats and primer compositions comprising such polyester polymers are also within the scope of the present invention as are substrates coated at least in part with such coatings.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" aromatic monoacid, "a" polyacid, "a" polyol, "an" aliphatic polyacid, and the like refers to one or more of any of these items.

As used herein, the transitional term "comprising" (and other comparable terms, e.g., "containing," and "including") is "open-ended" and is used in reference to compositions, methods, and respective component(s) thereof, that are essential to the invention, yet open to the inclusion of unspecified matter. The term "consisting essentially of" refers to those component(s) required for a given embodiment and permits the presence of component(s) that do not materially affect the properties or functional characteristic(s) of that embodiment. The term "consisting of" refers to compositions and methods that are exclusive of any other component not recited in that description of the embodiment.

The present invention is directed to polyester polymers that may be used to form coatings included, but not limited to, clear coatings and primer coatings that can be applied to at least a portion of a substrate. As used herein, the term "polymer" refers to oligomers and both homopolymers and copolymers. The term "resin" is used interchangeably with "polymer." The polyester polymer of the present invention comprises a polymer prepared from a reaction mixture comprising a polyacid component and a polyol component comprising lignin. Upon reaction, residues of the lignin are incorporated into a backbone of the polyester polymer. The polyester polymer may be dissolved or dispersed in a solvent. Coatings, which may be clear or tinted, comprising such polyester polymers incorporating lignin, are also within the scope of the present invention, as are substrates coated at least in part with such coatings, with or without an underlying base coat.

The term "polyacid" is used herein to refer to a compound having two or more acid groups and includes the ester and or anhydride of the acid. In one embodiment of the invention, the acid comprises a branched acid such as isophthalic acid, including its ester and/or anhydride. In certain other embodiments, one or more additional acids, including monoacids, can also be used. "Monoacid" and like terms, as used herein, refers to a compound having one acid group and includes the ester and/or anhydride of the acid. It will be understood by those skilled in the art that a polycarboxylic acid is one that has two or more carboxylic acid functional groups, or residues thereof, such as anhydride groups. Suitable polyacids include but are not limited to saturated polyacids such as adipic acid, azelaic acid, sebacic acid, succinic acid, glutaric acid, decanoic diacid, dodecanoic diacid, cyclohexanedioic acid, hydrogenated C36 dimer fatty acids, and esters and anhydrides thereof. Suitable monoacids include but are not limited to cycloaliphatic carboxylic acids including cyclohexane carboxylic acid, tricyclodecane carboxylic acid, camphoric acid, and aromatic mono carboxylic acids including benzoic acid and t-butylbenzoic acid; C1-C18 aliphatic carboxylic acids such as acetic acid, propanoic acid, butanoic acid, hexanoic acid, oleic acid, linoleic acid, nonanoic acid, undecanoic acid, lauric acid, isononanoic acid, other fatty acids, and those derived from hydrogenated fatty acids of naturally occurring oils such as coconut oil fatty acid; and/or esters and/or anhydrides of any of these. The additional acids comprise, at most, less than 10 mole %, such as no more than 5 mole % of the total acid and polyacids used in forming the branched polyester polymer.

In certain other embodiments, the additional monoacid comprises benzoic acid, its ester and/or its anhydride. In certain of these embodiments, the benzoic acid, its ester and/or its anhydride comprises up to 25 weight % of the total weight of the branched polyester polymer. In certain of these embodiments, the benzoic acid, its ester and/or its anhydride comprises between 5 and 15 weight % of the total weight of the branched polyester polymer. In certain of these embodiments, the benzoic acid, its ester and/or its anhydride comprises between 10 and 15 weight % of the total weight of the branched polyester polymer, such as 15 weight percent.

As noted above, the polyester polymer is prepared from a polyol component that comprises lignin. The polyol component may also include other polyols in addition to lignin. Lignin includes hydroxyl functional residues such that lignin functions as a polyol in the reaction of a polyol with a carboxylic acid to produce polyester.

Lignin is a macromolecular compound having a reactivity that can be determined by its particular structure with certain functional groups, which may include hydroxylic groups, both phenolic and aliphatic. Lignin has a heterogeneous structure and typically lacks a defined primary structure. In one embodiment, the lignin comprises wheat straw lignin, a lignin that is isolated from wheat straw. Alternatively, the lignin may comprise wood lignin, also referred to as organosol lignin, referring to the technique for separating wood lignin from cellulose materials via extraction with multiple organic solvents. As used herein, "organosol lignin" refers to such wood lignin. While lignin has been utilized as filler material in coating compositions, the present invention incorporates the lignin directly into the polymeric backbone of the polyester polymer. In certain embodiments, coating compositions of the present invention include lignin as a filler (e.g., in powder form) as well as incorporating lignin in the polymer backbone.

In embodiments where the polyester polymer is prepared from a reaction mixture that contains lignin as well as other hydroxyl functional components (e.g., polyols) the weight ratio of lignin to the hydroxyl functional components may range from 1:30 to 30:1, and the lignin may comprise 1-50 weight % of the polyester polymer, with the weight percent based on total solids of the end product.

In certain embodiments, the polyester polymer of the present invention is dissolved or dispersed in a solvent or a mixture of solvents. Typically, solvents that can be used to dissolve or disperse the polyester include, but are not limited to, water, organic compounds, and mixtures thereof. In certain embodiments, the solvent may be substantially free, may be essentially free, or may be completely free of water. The term "substantially free of water" means that the solvent contains less than 1000 parts per million (ppm) of water, "essentially free of water" means that the solvent contains less than 100 ppm of water, and "completely free of water" means that the solvent contains less than 20 parts per billion (ppb) of water.

Non-limiting examples of organic solvents that can be used to dissolve or disperse the polyester include glycols, glycol ether alcohols, alcohols, and ketones. Other non-limiting examples of organic solvents include aromatic hydrocarbons, such as xylene and toluene and those available from Exxon-Mobil Chemical Company under the SOLVESSO® trade name; acetates including glycol ether acetates, ethyl acetate, n-butyl acetate, n-hexyl acetate, and mixtures thereof; mineral spirits, naphthas and/or mixtures thereof. "Acetates" include the glycol ether acetates.

In certain embodiments, the amount of solvent added to disperse or dissolve the polyester is such that the polyester is 30 to 95 weight % based on resin solids. In certain embodiments, the amount of solvent added to disperse or dissolve the branched polyester is such that the polyester is 60 to 95 weight %, such as 85 weight %, based on resin solids. As a result, polyesters with extremely low volatile organic compounds (VOCs) may be obtained.

As mentioned above, the present invention is also directed to coating compositions that include any of the polyesters described above and a crosslinker. The crosslinker may be chosen to be reactive with the functional group or groups on the polyester. It will be appreciated that the coatings of the present invention can cure through the reaction of the hydroxyl groups and/or other functionality in the polyester and the crosslinker.

Non-limiting examples of crosslinkers include phenolic resins, amino resins, epoxy resins, beta-hydroxy (alkyl) amide resins, alkylated carbamate resins, isocyanates, polyacids, anhydrides, organometallic acid-functional materials, polyamines, polyamides, aminoplasts, and mixtures thereof.

Non-limiting examples of isocyanates include multifunctional isocyanates. Examples of multifunctional polyisocyanates include aliphatic diisocyanates, such as hexamethylene diisocyanate and isophorone diisocyanate, and aromatic diisocyanates such as toluene diisocyanate and 4,4'-diphenylmethane diisocyanate. The polyisocyanates can be blocked or unblocked. Examples of other suitable polyisocyanates include isocyanurate trimers, allophanates, and uretidiones of diisocyanates, and polycarbodiimides, such as those disclosed in U.S. Pat. No. 8,389,113, incorporated by reference in pertinent part herein. Suitable polyisocyanates are well known in the art and widely available commercially. Examples of commercially available isocyanates include DESMODUR® N 3300A, DESMODUR® Z 4470BA, DESMODUR® N 3900, and DESMODUR® N 3400, which are commercially available from Bayer Corporation.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used; for example, aldehyde condensates of glycoluril. While the aldehyde used is most often formaldehyde, other aldehydes, such as acetaldehyde, crotonaldehyde, and benzaldehyde may be used.

The aminoplast contains methylol groups and at least a portion of these groups may be etherified with an alcohol to modify the cure response. Any monohydric alcohol may be employed for this purpose including methanol, ethanol, butanol, and hexanol. Suitable aminoplasts resins, such as CYMEL® 202 or CYMEL® 303, are acceptable examples acting as curatives and are available from Cytec Industries.

In certain embodiments, to prepare coatings using the polyesters and crosslinkers described above, the polyesters and crosslinkers can be dissolved or dispersed in a solvent or a mixture of solvents. In certain embodiments, the solvent may be substantially free, may be essentially free, or may be completely free of water. The term "substantially free of water" means that the solvent contains less than 1000 parts per million (ppm) of water, "essentially free of water" means that the solvent contains less than 100 ppm of water, and "completely free of water" means that the solvent contains less than 20 parts per billion (ppb) of water.

Non-limiting examples of solvents that can be used to dissolve or disperse the polyesters and crosslinkers include any of the solvents described above. For instance, in certain embodiments, the solvent is an organic solvent that can include, but is not limited to, glycols, glycol ether alcohols, alcohols, and ketones; aromatic hydrocarbons, such as xylene and toluene and those available from Exxon-Mobil Chemical Company under the SOLVESSO® trade name; acetates including glycol ether acetates, ethyl acetate, n-butyl acetate, n-hexyl acetate, and mixtures thereof; and mineral spirits, naphthas and/or mixtures thereof. "Acetates" include the glycol ether acetates.

In certain embodiments, the coatings of the present invention may comprise from 1 to 100 weight %, such as from 5 to 80 weight %, or from 10 to 60 weight % of the polyester polymers described herein based on the total weight of the coating composition.

In certain embodiments, the coatings of the present invention comprise from 0 to 80 weight %, such as from 5 to 60 weight %, or from 8 to 40 weight % of a crosslinker or combination of crosslinkers based on the total weight of the coating composition.

It will be appreciated that the polyester polymers of the present invention (and crosslinkers if used) can form all or part of the film-forming resin of the coating. In certain embodiments, one or more additional film-forming resins are also used in the coating. For example, the coating compositions can comprise any of a variety of thermoplastic and/or thermosetting compositions known in the art.

Thermosetting or curable coating compositions typically comprise film-forming polymers or resins having functional groups that are reactive with either themselves or a crosslinking agent. The additional film-forming resin can be selected from, for example, acrylic polymers, additional polyester polymers that are the same or different than those described above, polyurethane polymers, polyamide polymers, polyether polymers, polysiloxane polymers, polyepoxy polymers, epoxy resins, vinyl resins, copolymers thereof; and mixtures thereof. Generally, these polymers can be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinking agent that may be selected from any of the crosslinkers described above or known in the art to react with the functionality used in the coating. In certain embodiments, the present coatings comprise a thermosetting film-forming polymer or resin and a crosslinking agent therefor and the crosslinker is either the same or different from the crosslinker that is used to crosslink the polyesters described herein. In certain other embodiments, a thermosetting film-forming polymer or resin having functional groups that are reactive with themselves are used; in this manner, such thermosetting coatings are self-crosslinking.

In certain embodiments, the coatings of the present invention also include a curing catalyst. Any curing catalyst typically used to catalyze crosslinking reactions between polyester resins and crosslinkers may be used, and there are no particular limitations on the catalyst. Non-limiting examples of such a curing catalyst include phosphoric acid, alkyl aryl sulphonic acid, dodecyl benzene sulphonic acid, dinonyl naphthalene sulphonic acid, and dinonyl naphthalene disulphonic acid; complexes of organometallic compounds including tin, zinc, or bismuth; or tertiary amine bases. "Curing" refers to bond formation between the polyester and crosslinker resulting in the formation of a cross-linked coating. Curing may occur upon application of an external stimulus including, but not limited to, heat, ultraviolet irradiation, exposure to moisture, and exposure to atmospheric oxygen.

In certain embodiments, the coatings of the present invention may comprise from 0 to 7 weight %, such as from 0.001 to 5 weight % of a curing catalyst based on the total weight of the coating composition.

The coating compositions of the present invention can also include other optional materials well known in the art of formulating coatings. For example, the coating compositions of the present invention can also include a colorant. As used herein, "colorant" refers to any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. A "filler," on the other hand, does not necessarily impart any color and/or opacity and/or other visual effect to the composition.

Examples of colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Examples of pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Examples of dyes include, but are not limited to, those that are solvent and/or aqueous based such as phthalo green or blue, iron oxide, bismuth vanadate, anthraquinone, perylene, and quinacridone.

Examples of tints include, but are not limited to, pigments dispersed in water-based or water miscible carriers such as AQUA-CHEM® 896 commercially available from Degussa, Inc., CHARISMA COLORANTS and MAX-ITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Examples of nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution).

In order to minimize re-agglomeration of nanoparticles within the composition and resulting coating, a dispersion of resin-coated nanoparticles can sometimes be used. As used herein, a "dispersion of resin-coated nanoparticles" refers to a continuous phase in which is dispersed discreet "composite microparticles" that comprise a nanoparticle and a resin coating on the nanoparticle. Examples of dispersions of resin-coated nanoparticles and methods for making them are described, for example, in U.S. Pat. No. 7,605,194 at col. 3, line 56 to col. 16, line 25, the cited portion of which is incorporated herein by reference.

Examples of special effect compositions that may be used in the compositions of the present invention include pigments and/or compositions that produce one or more visual effects such as reflectance, pearlescence, metallic sheen, phosphorescence, fluorescence, photochromism, photosensitivity, thermochromism, goniochromism, and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

Other non-limiting examples of materials that can be used with the coating compositions of the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, fillers, organic cosolvents, reactive diluents, catalysts, reaction inhibitors, and other customary auxiliaries.

In certain embodiments, the optional materials such as colorants may comprise from 0 weight % to 80 weight %, such as from 0.01 weight % to 60 weight % based on total weight of the coating composition.

The coatings of the present invention can be applied to a wide range of substrates known in the coatings industry. For example, the coatings of the present invention can be applied to automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Metallic substrates include tin, steel, tin-plated steel, chromium passivated steel, galvanized steel, aluminum, and/or aluminum foil. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, or leather (both synthetic and natural), and the like.

The coatings of the present invention can be applied by any means standard in the art, such as electrocoating, spraying, electrostatic spraying, dipping, rolling, brushing, and the like. The coatings of the present invention can be applied to a dry film thickness of 0.05 mils to 20 mils, such as from 0.5 mils to 5 mils, or from 0.8 mils to 3 mils.

The polyesters described above can be used in a variety of coating types. For example, the polyesters can be used with a one component (1K), or multi-component compositions, such as two component (2K) or more. As used herein, a 1K coating composition refers to a composition wherein all the coating components are maintained in the same container after manufacture, during storage, etc. In a 1K coating, the reactive components do not readily react at ambient or slightly thermal conditions, but instead only react upon activation by an external energy source. As used herein, "ambient conditions" refers to room temperature and humidity conditions or temperature and humidity conditions that are typically found in the area in which the coating composition is being applied to a substrate, while "slightly thermal conditions" are temperatures that are slightly above ambient temperature but are generally below the curing temperature for the coating composition. A 1K coating can be applied to a substrate and cured by any conventional means, such as by heating, forced air, and the like. In contrast, a multi-component composition such as a 2K composition refers to a coating in which various components are maintained separately until just prior to application. In a multi-component composition, the reactive components readily react and cure without activation from an external energy source.

The coating compositions of the present invention may be used as clearcoats or pigmented coats. A clearcoat refers to a coating that is substantially transparent. A clearcoat can, therefore, have some degree of color, provided it does not make the clearcoat opaque or otherwise affect, to any significant degree, the ability to see the underlying substrate. In contrast, a pigmented coat will impart some sort of color and/or other visual effect to the substrate to which it is applied.

The coating compositions of the present invention may also be used alone or in combination as primers, basecoats, and/or topcoats. A "primer coating composition" refers to coating compositions from which an undercoating may be deposited onto a substrate in order to prepare the surface for application of a protective or decorative coating system. Such compositions are often topcoated with a protective and decorative coating system, such as a monocoat topcoat or a combination of a pigmented base coating composition and a clearcoat composition.

It has been found that coating compositions including polyester polymers having lignin in the backbone thereof are less costly than traditional polyester polymers not including lignin in the backbone thereof and provide corrosion resistance to substrates. In addition, the coating composition of the present invention provides increased protection of an underlying substrate, such as a metallic substrate (e.g. a steel substrate) from corrosion as compared to a substrate coated with a coating composition comprising a polyester polymer not incorporating lignin. As such, the present invention further includes a method of protecting a substrate from corrosion comprising applying to the substrate the polyester coating composition incorporating lignin as described herein.

The following examples are presented to demonstrate the general principles of the invention. The invention should not be considered as limited to the specific examples presented. All parts and percentages in the examples are by weight unless otherwise indicated.

EXAMPLES

Example 1: Polyester Polymers for Clearcoats

Polyester polymers for use in clearcoat compositions were prepared using the components listed in Table 1. In each of Examples 1A, 1B, 1C, and 1D, all components except solvent were combined and heated under a nitrogen atmosphere to 220° C. and held for the time indicated in Table 1. The reaction products had acid values (mg KOH/g) as indicated in Table 1. The samples were cooled to ambient temperature and dissolved in solvent as indicated in Table 1.

TABLE 1

| | Components (weight in grams) | | | |
|---|---|---|---|---|
| | Ex. 1A Control | Ex. 1B 10% lignin | Ex. 1C 20% lignin | Ex. 1D 10% lignin |
| 2-methyl-1,3-propenediol | 246.6 | 215.51 | 197.64 | 972 |
| trimethylolpropane | 8.27 | 7.22 | 6.63 | 32.59 |
| adipic acid | 59.02 | 51.57 | 47.29 | 232.6 |
| isophthalic acid | 191.24 | 167.09 | 153.24 | 753.6 |
| phthalic anhydride | 170.50 | 148.96 | 136.62 | 671.9 |
| butyl stannoic acid | 0.68 | 0.65 | 0.65 | 2.93 |
| triphenyl phosphate | 0.34 | 0.32 | 0.32 | 1.46 |
| PROTOBIND ® 1000[1] | — | 58.68 | 107.61 | 264.7 |
| | Conditions/Results | | | |
| Reaction time | 10 | 12 | 14 | 16 |
| Acid value (mgKOH/g) | 3.8 | 9.5 | 12.0 | 10.1 |
| Solvent added[2] | 328.1 | 312.4 | 141.6 | 392.0 |

[1]Wheat straw lignin supplied by ALM India
[2]Solvent mixture 63 wt. % 1-methoxy-2-propanol, 18.5 wt % butanol, 18.5 wt % SOLVESSO 100 (naptha solvent supplied by Exxon Mobil Chemical.)

Example 2: Clearcoats

Clearcoat compositions were prepared from the polyester polymers of Example 1 by combining all solvents in a suitable sized container, and adding the polyester polymers and other components in the order shown in Table 2. The clearcoat compositions were drawn down on aluminum substrates to approximately 0.70 mil and baked in a conveyor oven for 30 seconds to a peak metal temperature of 450° F. All panels passed 100 MEK rubs (cure) and exhibited 5B crosshatch adhesion (no removal). Pencil hardness and gloss retention showed increases with the increase in lignin content. Flexibility was tested using reverse impact at 30 lbs. All offsets passed reverse impact with no pick and no cracking.

TABLE 2

| Components (weight in grams) | Ex. 2A (control) | Ex. 2B (polyester with 10% lignin) | Ex. 2C (polyester with 20% lignin) |
|---|---|---|---|
| Polyester Ex. 1A | 139.67 | — | — |
| Polyester Ex. 1B | — | 127.43 | — |
| Polyester Ex. 1C | — | — | 128.07 |
| hexamethoxymethyl melamine resin[3] | 7.96 | 16.61 | 23.27 |
| butanol | 3.00 | 3.00 | 3.00 |
| DIAX ® 2770[4] | 0.40 | 0.40 | 0.40 |
| COROC ® A-72-A260[5] | 0.50 | 0.50 | 0.50 |
| COROC ® A-620-A2[6] | 0.83 | 0.83 | 0.83 |
| para-toluene sulfonic acid | 0.50 | 0.50 | 0.50 |
| SOLVESSO ® 100 | 12.50 | 21.00 | 26.00 |
| ethylene glycol monobutyl ether | 12.50 | 210.00 | 26.00 |

[3]Supplied by Allnex Belgium SA/NV, Brussels, Belgium
[4]Hyberbranched hydrocarbon polymer supplied by Baker Hughes, Houston, TX
[5]Acrylic resin supplied by Arkema Coating Resins, Cary, NC
[6]Acrylic resin supplied by Arkema Coating Resins, Cary, NC Example 3: Primers with Lignin Polyester Primer compositions were prepared from polyester polymers of Example 1 by combining all solvents in a suitable sized container and adding the polyester polymer and the other components in the order shown in Table 3.

TABLE 3

| Components (weight in grams) | No lignin in primer resin | | Wheat straw lignin in primer resin | |
|---|---|---|---|---|
| | Ex. 4A | Ex. 4B | Ex. 4C | Ex. 4D |
| Polyester Ex. 1A | 123.0 | 123.0 | | |
| Polyester Ex. 1D | | | 90.5 | 90.5 |
| phosphatized epoxy resin[7] | 8.1 | 8.1 | 8.1 | 8.1 |
| hexamethoxymethyl melamine resin | 15.0 | 15.0 | 36.6 | 36.6 |
| wheat straw lignin powder (PROTOBIND ® 1000) filler | — | 20.0 | — | 20.0 |
| n-butyl alcohol | — | 3.0 | — | — |
| SOLVESSO ® 100 | 7.0 | 24.5 | 15.5 | 35.8 |
| 2-butoxyethanol | 7.0 | 24.5 | 15.5 | 35.8 |
| toluene sulfonic acid solution | 0.5 | 0.5 | 0.5 | 0.5 |
| Total | 160.6 | 218.6 | 166.7 | 227.3 |

[7]Supplied by PPG Industries, Inc.

The topcoated samples were subjected to 2000 hours of salt spray testing to ASTM B117 in which the samples were exposed to a 5% NaCl salt fog at pH 6.2-7.2 at 35° C. (95° F.). Salt spray test results are reported in Table 4.

TABLE 4

Salt Spray after 2000 Hours

| Example | Scribe Creep (mm) | Primer Composition |
|---|---|---|
| Aluminum | | |
| 4A | 0 | Polyester control |
| 4B | 0 | Polyester resin and 20 wt. % wheat straw lignin powder added as filler |
| 4C | 0 | Polyester/10% lignin resin |
| 4D | 0 | Polyester/10% lignin resin and 20 wt. % wheat straw lignin powder |
| HDG | | |
| 4A | 15.9 | Polyester control |
| 4B | 5.9 | Polyester resin and 20 wt. % wheat straw lignin powder added as filler |
| 4C | 8.7 | Polyester/10% lignin resin |
| 4D | 5.6 | Polyester/10% lignin resin and 20 wt. % wheat straw lignin powder |

Examples 4C and 4D (10% lignin, without and with lignin filler, respectively) exhibited improved corrosion resistance over Examples 4A and 4B (no lignin, without and with lignin filler, respectively).

Although the present invention has been described with reference to specific details of certain embodiments thereof, it is not intended that such details should be regarded as limitations upon the scope of the invention except insofar as they are included in the accompanying claims.

The invention claimed is:

1. A method of protecting a metal substrate from corrosion comprising:
   (i) applying a coating composition over at least a portion of a substrate comprising metal, the coating composition comprising a mixture of reactants comprising:
      (a) a polycarboxylic acid component; and
      (b) a polyol component consisting essentially of:
         (1) a lignin component consisting essentially of wheat straw lignin, and
         (2) at least one other hydroxyl functional component not including lignin,
      such that residues of the wheat straw lignin are incorporated into the coating composition,
      wherein the polycarboxylic acid component and the hydroxyl functional component not including lignin react to form a polyester,
      wherein the wheat straw lignin is incorporated into the backbone of the polyester,
      wherein the polyester contains from 10 to 20 weight % wheat straw lignin incorporated in the backbone based on total solids and the coating composition optionally comprises 0 to 20 weight % of wheat straw lignin as filler based on total solids; and
   (ii) curing the coating composition to form a thermoset polyester coating.

2. The method of claim 1, wherein in the metal comprises aluminum and/or steel.

3. The method of claim 1, wherein the coating composition further comprises a crosslinker reactive with hydroxyl groups of the coating composition.

4. The method of claim 1, wherein the coating composition further comprises a colorant.

5. The method of claim 1, wherein the coating composition is applied directly to the substrate as a primer coating composition.

6. The method of claim 5, further comprising applying a topcoat over the primer coating composition.

7. The method of claim 1, further comprising, prior to application of the coating composition, applying an undercoat over the at least a portion of the substrate, such that the undercoat is disposed between the substrate and the coating composition.

8. The method of claim 7, wherein the coating composition comprises a clearcoat.

9. The method of claim 1, wherein the cured coating exhibits flexibility such that the cured coating passes a reverse impact test at 30 lbs.

10. The method of claim 2, wherein the metal comprises hot dipped galvanized steel.

* * * * *